United States Patent
Kita et al.

(10) Patent No.: US 12,545,582 B2
(45) Date of Patent: *Feb. 10, 2026

(54) PROCESS FOR THE REMOVAL OF HEAVY METALS FROM A PHOSPHORIC ACID CONTAINING COMPOSITION USING A FLOCCULATING AGENT

(71) Applicant: Yara International ASA, Oslo (NO)

(72) Inventors: Patrycja Kita, Poznan (PL); Tanja Vojnovic, Skien (NO); Tom Rames Jørgensen, Porsgrunn (NO); Per Arne Jordbræk, Sofiemyr (NO)

(73) Assignee: YARA INTERNATIONAL ASA, Oslo (NO)

( * ) Notice: Subject to any disclaimer, the term of this patent is extended or adjusted under 35 U.S.C. 154(b) by 440 days.

This patent is subject to a terminal disclaimer.

(21) Appl. No.: 18/008,812

(22) PCT Filed: Jun. 16, 2021

(86) PCT No.: PCT/EP2021/066174
§ 371 (c)(1),
(2) Date: Dec. 7, 2022

(87) PCT Pub. No.: WO2021/255062
PCT Pub. Date: Dec. 23, 2021

(65) Prior Publication Data
US 2023/0227311 A1    Jul. 20, 2023

(30) Foreign Application Priority Data

Jun. 16, 2020 (EP) ..................... 20180341
Sep. 8, 2020 (EP) ..................... 20195106

(51) Int. Cl.
C01B 25/238    (2006.01)
C01B 25/234    (2006.01)
(Continued)

(52) U.S. Cl.
CPC .......... *C01B 25/238* (2013.01); *C01B 25/234* (2013.01); *C02F 1/56* (2013.01);
(Continued)

(58) Field of Classification Search
None
See application file for complete search history.

(56) References Cited

U.S. PATENT DOCUMENTS 4,308,214 A     12/1981 Robertson
4,334,074 A *   6/1982 Peterson ............... C07D 213/79
                                                 205/426
(Continued)

FOREIGN PATENT DOCUMENTS

CN    1036745    11/1989
CN    1109025    9/1995
(Continued)

OTHER PUBLICATIONS

Machine translation of WO-2014038537-A1, pp. 1-14. (Year: 2014).*
(Continued)

*Primary Examiner* — Clare M Perrin
(74) *Attorney, Agent, or Firm* — DILWORTH IP, LLC

(57) ABSTRACT

Improved methods for the removal of heavy metals, in particular cadmium, from an aqueous phosphoric acid containing composition, wherein an ionic polymeric flocculating agent is added to a phosphoric acid containing composition subsequent to the addition of an organothiophosphorous heavy metal precipitating agent to said composition, particularly under gentle mixing conditions, such as between 100 and 300 rpm. The flocculating agent promotes the formation of agglomerates of the heavy metal containing precipitate, thus facilitating their removal from the composition. More in particular, the phosphoric acid containing composition is obtained by the acid diges-
(Continued)

tion of phosphate rock, preferably by nitric acid, sulfuric acid, or a combination thereof.

16 Claims, 3 Drawing Sheets

(51) Int. Cl.
 *C02F 1/56*   (2023.01)
 *C02F 1/68*   (2023.01)
 *C02F 9/00*   (2023.01)
 *C22B 3/26*   (2006.01)
 *C22B 3/38*   (2006.01)
 *B03D 3/06*   (2006.01)
 *C02F 101/20*   (2006.01)
 *C02F 103/10*   (2006.01)

(52) U.S. Cl.
 CPC ............... *C02F 1/683* (2013.01); *C02F 9/00* (2013.01); *C22B 3/26* (2021.05); *C22B 3/382* (2021.05); *B03D 3/06* (2013.01); *C01P 2006/80* (2013.01); *C02F 2101/20* (2013.01); *C02F 2103/10* (2013.01); *C02F 2209/06* (2013.01)

(56) References Cited

U.S. PATENT DOCUMENTS

| | | | |
|---|---|---|---|
| 4,378,340 A | | 3/1983 | Berglund |
| 4,437,997 A | * | 3/1984 | Dobry ................ C01B 25/405 |
| | | | 71/36 |
| 4,479,924 A | * | 10/1984 | von Plessen ......... C01G 21/003 |
| | | | 423/100 |
| 4,584,111 A | | 4/1986 | Collett |
| 4,634,580 A | | 1/1987 | Jdid |
| 4,762,693 A | | 8/1988 | Schimmel |
| 4,986,970 A | * | 1/1991 | Haraldsen ............... C22B 17/04 |
| | | | 423/321.1 |
| 5,173,280 A | | 12/1992 | Rey |
| 5,378,262 A | | 1/1995 | Mihaylov et al. |
| 5,656,175 A | | 8/1997 | Bossier |
| 2004/0136889 A1 | | 7/2004 | Bonath |
| 2004/0179984 A1 | | 9/2004 | Nagaraj |
| 2012/0193296 A1 | | 8/2012 | Bhaduri |
| 2019/0106324 A1 | * | 4/2019 | Zhang ................... C01B 25/238 |

FOREIGN PATENT DOCUMENTS

| | | |
|---|---|---|
| CN | 1109913 A | 10/1995 |
| CN | 101560004 | 10/2009 |
| CN | 104478060 | 4/2015 |
| CN | 105944451 | 9/2016 |
| CN | 206624725 | 11/2017 |
| CN | 109205846 | 1/2019 |
| DE | 3209183 A1 | 9/1983 |
| DE | 3502215 | 7/1986 |
| EP | 0039119 | 11/1981 |
| EP | 0091043 | 10/1983 |
| FI | 830270 | 7/1983 |
| FR | 2870229 | 11/2005 |
| RU | 2386592 C2 | 4/2010 |
| WO | 8908075 | 9/1989 |
| WO | 2004083118 | 9/2004 |
| WO | 2011154991 | 12/2011 |
| WO | WO-2014038537 A1 * | 3/2014 ............... C02F 1/56 |
| WO | 2019071108 | 4/2019 |

OTHER PUBLICATIONS

Xu Zhaoxi, Heavy metal removal by wet phosphoric acid precipitation method, Inorganic Salt Industry, No. 02, Apr. 20, 1989, 4 pages.
He Zhiru, Li Ning, Research on wastewater treatment technology for storage battery production, Environmental Science and Management, No. 12, Dec. 15, 2011.
English translation of Chinese Office Action issued in App. No. CN202180028802, dated Sep. 8, 2023, 18 pages.
Chinese Office Action (including English translation) issued in App. No. CN202180028835, dated Jan. 13, 2024, 26 pages.
English translation of Chinese Office Action issued in App. No. CN202180028802, dated Jan. 11, 2024, 15 pages.
English translation of Chinese Office Action issued in App. No. CN202180034830, dated Jan. 17, 2024, 13 pages.
English translation of Chinese Office Action issued in App. No. CN202180028835, dated Sep. 8, 2023, 17 pages.
English Abstract of EP0085344 (A2), corresponding to FI 830270, Hoechst AG.
International Search Report and Written Opinion issued in App. No. PCT/EP2021/066174, mailing date Oct. 13, 2021, 12 pages.
International Preliminary Report on Patentability issued in App. No. PCT/EP2021/066179, mailing date Mar. 16, 2022, 14 pages.
International Preliminary Report on Patentability issued in App. No. PCT/EP2021/066244, mailing date Apr. 8, 2022, 16 pages.
International Search Report and Written Opinion issued in App. No. PCT/EP2021/066244, mailing date Oct. 6, 2021, 13 pages.
International Search Report and Written Opinion issued in App. No. PCT/EP2021/066246, mailing date Oct. 6, 2021, 12 pages.
Swe Swe Mar & Masanori Okazaki, Microchemical Journal 104 (17-21), Sep. 2012.
Office Action (including English translation) issued in App. No. EA20229299328, dated May 20, 2024, 10 pages.
Jing et al., "Port Environmental Pollution Control Technology", Ocean Press, Nov. 30, 2007, 4 pages.
Office Action and Search Report received for Chinese Application No. 202180034903, mailed on Feb. 15, 2025, 18 pages (8 pages of original office action and 10 pages of English Translation).

* cited by examiner

ADJUSTMENT OF THE pH OF A PHOSPHORIC ACID CONTAINING COMPOSITION
(pH 1.6-2.2 measured after a 13-fold dilution by volume using water)
ADDITION OF PRECIPITATING AGENT
(under vigorous mixing)
ADDITION OF (FIRST) FLOCCULATING AGENT
(under gentle mixing)
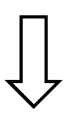
SEPARATION OF PRECIPITATE/AGGLOMERATE
FROM FILTRATE/SUPERNATANT
FIG. 1

```
┌─────────────────────────────────────────────────────────────┐
│ ADJUSTMENT OF THE pH OF A PHOSPHORIC ACID CONTAINING        │
│                     COMPOSITION                             │
│ (pH 1.6-2.2 measured after a 13-fold dilution by volume using water) │
└─────────────────────────────────────────────────────────────┘
                            ⇓
┌─────────────────────────────────────────────────────────────┐
│           REMOVAL OF SLUDGE/INSOLUBLE FRACTION              │
└─────────────────────────────────────────────────────────────┘
                            ⇓
┌─────────────────────────────────────────────────────────────┐
│               ADDITION OF PRECIPITATING AGENT               │
│                   (under vigorous mixing)                   │
└─────────────────────────────────────────────────────────────┘
                            ⇓
┌─────────────────────────────────────────────────────────────┐
│           ADDITION OF (FIRST) FLOCCULATING AGENT            │
│                    (under gentle mixing)                    │
└─────────────────────────────────────────────────────────────┘
                            ⇓
┌─────────────────────────────────────────────────────────────┐
│          SEPARATION OF PRECIPITATE/AGGLOMERATE              │
│               FROM FILTRATE/SUPERNATANT                     │
└─────────────────────────────────────────────────────────────┘
```

FIG. 2

PROCESS FOR THE REMOVAL OF HEAVY METALS FROM A PHOSPHORIC ACID CONTAINING COMPOSITION USING A FLOCCULATING AGENT

FIELD

The present disclosure relates to the field of removing heavy metal ions, including but not limited to cadmium, from wet-process acidic compositions. More in particular, the present disclosure relates to removing heavy metal ions, such as cadmium, from phosphoric acid containing process streams.

BACKGROUND

Heavy metals such as cadmium, copper, nickel, lead, zinc and mercury are considered unacceptable above a certain level, depending on the application, because of their toxicity and they thus have to be either completely removed or their levels have to be reduced significantly. Many processes have been developed over the years for their removal.

In this context, the phosphate rock extracted from phosphate mines typically contains heavy metal impurities, such as cadmium, copper, arsenic, or mercury. For instance, cadmium typically is present at levels between 0.15 to 507 mg/kg of phosphate rock having an average phosphorous ($P_2O_5$) content of about 30 weight % (Swe Swe Mar & Masanori Okazaki, Microchemical Journal 104 (17-21), September 2012). Unless the heavy metals are removed from the phosphate rock prior to or during its digestion with acid, such as prior to or during the nitro-phosphate process, the resulting phosphate-based products and fertilizers will contain cadmium and other heavy metals. Some forms of heavy metals, such as cadmium, can be taken up by plants and, thereby, end up in the food chain. For instance, cadmium can cause damage to lungs, kidneys, and bones. Therefore, it is essential to limit the level of heavy metals, such as cadmium, in fertilizers. The European Union is now considering a limit of 60 mg cadmium per kilogram of phosphorous (expressed as $P_2O_5$). However, Finland is applying an even lower limit such as 21.5 mg of cadmium per kilogram of $P_2O_5$. The level of the heavy metal impurities thus has to be significantly reduced.

The precipitation of heavy metals, such as cadmium, in the nitro-phosphate process or in other processes comprising the acid digestion of phosphate rock, has previously been reported.

U.S. Pat. No. 4,378,340 discloses a method of removing heavy metals from an acid digest of phosphate rock by partial neutralization of the acids followed by precipitation of the heavy metals as sulphides.

U.S. Pat. No. 4,986,970 discloses a method for removal of heavy metals, especially cadmium, primarily from a mother liquor made by the Odda process, using metal salts of dithiocarbonic acid-O-esters, referred to as xanthates, at a pH ranging from 1.4 and 2.0 and at temperatures ranging from 5 to 40° C.

US20040179984 discloses a process and compositions to remove heavy metal ions, such as cadmium, copper, lead, nickel, arsenic, manganese, zinc, and mercury ions from the wet phosphoric acid process. The process involves treating phosphoric acid prior to or after gypsum filtration with diorgano-dithiophosphinic acid (or alkali metal or ammonia salts thereof), a first diorgano-dithiophosphoric acid (or alkali metal or ammonia salts thereof) and optionally a second diorgano-dithiophosphoric acid (or alkali metal or ammonia salts thereof), precipitating metals such as cadmium, copper, lead, nickel, arsenic, manganese, zinc and mercury at a temperature from about 10 to about 85° C. and preferably in the range of about 50 to about 80° C., and separating the filtrate by either filtration or flotation. In this context, the examples only indicate that these compounds are effective in phosphoric acid, in particular at temperatures ranging from 60 to 80° C.

EP0091043 discloses the use of similar heavy metal removal agents as disclosed in US20040179984 for the removal of cadmium by precipitation from the Odda process.

WO2019071108 discloses the simultaneous use of organothiophosphorous compounds and surfactants, in particular sulfosuccinate compounds and polyethyleneglycol esters for removing heavy metal ions from aqueous solutions containing phosphoric acid, in particular in various stages of wet process phosphoric acid production.

Nevertheless, despite the various approaches of the prior art, the removal of heavy metals, such as cadmium, from a phosphate rock digest by concentrated acid, such as nitric acid, remains challenging due to the very acidic and oxidizing conditions in the liquor, and the presence of calcium, which may affect heavy metal precipitation as well. In addition, heavy metal contamination, especially cadmium, remains a concern to public health. In this context, as indicated above, regulatory agencies continue to impose lower limits on the acceptable level of heavy metals, in particular cadmium. There thus remains a need for improved methods for the efficient removal of heavy metals, such as cadmium, from phosphoric acid containing compositions.

SUMMARY

The present disclosure provides improved methods for the removal of heavy metals, in particular cadmium, from an aqueous phosphoric acid containing composition, which address the above identified needs in the art. In the improved methods of the present disclosure, a flocculating agent is added to a phosphoric acid containing composition, particularly under gentle mixing conditions, such as between 100 and 300 rpm, subsequently to the addition of a heavy metal precipitating agent.

Advantageously, the flocculating agent promotes the formation of agglomerates of the heavy metal precipitates, thereby facilitating the separation of the heavy metal precipitates from the phosphoric acid containing composition. Advantageously, by using an anionic flocculating agent as envisaged herein, there is no need for combining a heavy metal precipitating agent with a surfactant, such as a sulfosuccinate compound or a polyethyleneglycol ester. The methods of the present disclosure are particularly suited for the removal of heavy metals, such as cadmium, from an aqueous composition of the nitro-phosphate process, comprising both phosphoric acid and nitric acid, without hydrogen sulphide or NOx formation resulting from side reactions of the heavy metal precipitating agent.

According to one aspect of the present disclosure, a method is disclosed for the removal of heavy metals, in particular cadmium, dissolved in a phosphoric acid containing composition, wherein the method comprises the steps of (a) providing a phosphoric acid containing composition comprising dissolved heavy metals, such as cadmium;

(b) precipitating the dissolved heavy metals by adding a heavy metal precipitating agent to the composition of step (a), at a pH of at least 1.6 measured after a 13-fold dilution by volume using water, thereby obtaining a heavy metal precipitate in a phosphoric acid containing composition, wherein the heavy metal precipitating agent comprises a diorgano-dithiophosphinic acid or an alkali metal or ammonia salt thereof, represented by Formula 1

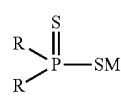

Formula 1 wherein R is a linear or branched hydrocarbon group selected from alkyl, aryl, alkylaryl, or aralkyl, and wherein the hydrocarbon group contains 3 to 20 carbon atoms, and M is H, alkali metal or ammonia;
wherein the method further comprises the step of
(c) adding a first flocculating agent to the composition obtained in step (b), wherein said first flocculating agent is a cationic polymer wherein 20% to 80%, particularly 20% to 60% or 30% to 50%, more particularly 35% to 45% of the moieties making up the cationic polymer are cationic charged moieties, an anionic polymer wherein 10% to 50%, particularly 10% to 40%, more particularly 15% to 30% of the moieties making up the anionic polymer are anionic charged moieties, or a mixture thereof, thereby obtaining agglomerates comprising the heavy metal precipitate in a phosphoric acid containing composition; and
(d) separating the agglomerates comprising the heavy metal precipitate from the phosphoric acid containing composition obtained in step (c).

According to an embodiment of the present disclosure, R in Formula 1 is selected from the group consisting of cyclohexyl, isopropyl, isobutyl, n-propyl, octyl, hexyl, phenylethyl and 2,4,4-trimethylpentyl, particularly wherein the heavy metal-precipitation agent is sodium diisobutyldithiophosphinate. Advantageously, precipitating agents according to Formula 1 have a good cadmium extraction efficacy and are less hazardous compared to inorganic sulphides and xanthates. In particular, precipitating agents according to Formula 1 result in lower (if any) $H_2S$, COS or $CS_2$ emissions compared to inorganic sulphides and xanthates.

According to an embodiment of the present disclosure, step (a) further comprises the steps of
(i) adjusting the pH of a phosphoric acid containing composition comprising dissolved heavy metals to a pH of at least pH 1.6 measured after a 13-fold dilution by volume using water, particularly by addition of ammonia; thereby obtaining a phosphoric acid containing composition comprising a sludge fraction;
(ii) optionally adding a second flocculating agent to the composition of step (i), wherein said second flocculating agent is a cationic polymer wherein 20% to 80%, particularly 20% to 60% or 30% to 50%, more particularly 35% to 45% of the moieties making up the cationic polymer are cationic charged moieties, an anionic polymer wherein 10% to 50%, particularly 10% to 40%, more particularly 15% to 30% of the moieties making up the anionic polymer are anionic charged moieties, or a mixture thereof;
(iii) separating the sludge fraction from the composition of step (i) or (ii).

Advantageously, removing the sludge fraction prior to step b) results in the addition of the heavy metal precipitating agent to an acid composition with a reduced amount of particles and/or sludge, thus facilitating the heavy metal precipitation and yielding a more concentrated heavy metal precipitate.

According to an embodiment of the present disclosure, the first and/or second flocculating agent is a copolymer of (meth)acrylamide, particularly a copolymer of (meth)acrylamide and a chloro-methylated monomer, such as dimethylaminoethyl (meth)acrylate, or a copolymer of (meth)acrylamide and (meth)acrylic acid.

According to an embodiment of the present disclosure, the molecular weight (MW) of the polymeric flocculating agent ranges from $3 \times 10^6$ to $14 \times 10^6$ Dalton.

According to an embodiment of the present disclosure, the flocculating agent is added in a dose of 3 to 30 $g/m^3$ acid composition, particularly in a dose of 3 to 20 $g/m^3$ acid composition, such as in a dose of 5 to 20 $g/m^3$ or 10 to 20 $g/m^3$ acid composition.

According to an embodiment of the present disclosure, the precipitation and/or flocculation steps are performed at a temperature of 5 to 50° C. Advantageously, lower temperatures promote the stability of the heavy metal precipitates.

According to an embodiment of the present disclosure, the phosphoric acid containing composition is an acid digest of phosphate rock, preferably by nitric acid, sulfuric acid, or a combination thereof. In particular embodiments, the phosphoric acid containing composition is an acidic aqueous composition comprising from 6-21 wt % nitric acid, from 25 to 33 wt % phosphoric acid, from 3.5 to 5 wt % calcium and dissolved heavy metals, such as cadmium, with wt % being based on the total weight of the composition.

According to an embodiment of the present disclosure, the heavy metals are selected from cadmium, copper, nickel, mercury, zinc, arsenic, manganese and/or lead; preferably the heavy metals are cadmium, copper and/or zinc; even more preferably the heavy metal is cadmium.

Another aspect of the present disclosure provides for the use of a flocculating agent, for flocculating heavy metal precipitates in a phosphoric acid containing composition, wherein the heavy metal precipitate is a heavy metal precipitated from a phosphoric acid composition with a diorgano-dithiophosphinic acid or an alkali metal or ammonia salt thereof, represented by Formula 1 above, as the heavy metal precipitating agent, wherein R is a linear or branched hydrocarbon group selected from alkyl, aryl, alkylaryl, or aralkyl, and wherein the hydrocarbon group contains 3 to 20 carbon atoms, and M is H, alkali metal or ammonia, wherein the flocculating agent is a cationic polymer wherein 20% to 80%, particularly 20% to 60% or 30% to 50%, more particularly 35% to 45% of the moieties making up the cationic polymer are cationic charged moieties, an anionic polymer wherein 10% to 50%, particularly 10% to 40%, more particularly 15% to 30% of the moieties making up the anionic polymer are anionic charged moieties, or a mixture thereof. More in particular, the flocculating agent is a cationic or anionic polymer with an ionic charge ranging from 10% to 60%, or a mixture thereof. More in particular, the flocculating agent is a copolymer of (meth)acrylamide, particularly a copolymer of (meth)acrylamide and a chloro-methylated monomer, such as dimethylaminoethyl (meth)acrylate, a copolymer of (meth)acrylamide and (meth)acrylic acid, or a mixture thereof.

DESCRIPTION OF THE FIGURES

FIG. 1 schematically represents a particular embodiment of the method according to the present disclosure, comprising the steps, in sequence, of adjusting the pH of a phosphoric acid composition to 1.6-2.2 measured after a 13-fold dilution by volume using water, adding a precipitating agent, adding a (first) flocculating agent and separating the precipitate from the filtrate/supernatant.

FIG. 2 schematically represents a particular embodiment of the method according to the present disclosure, comprising the steps, in sequence, of adjusting the pH of a phosphoric acid composition to 1.6-2.2 measured after a 13-fold dilution by volume using water, removing a sludge fraction, adding a precipitating agent, adding a (first) flocculating agent and separating the precipitate from the filtrate/supernatant.

DETAILED DESCRIPTION

Figure 3:
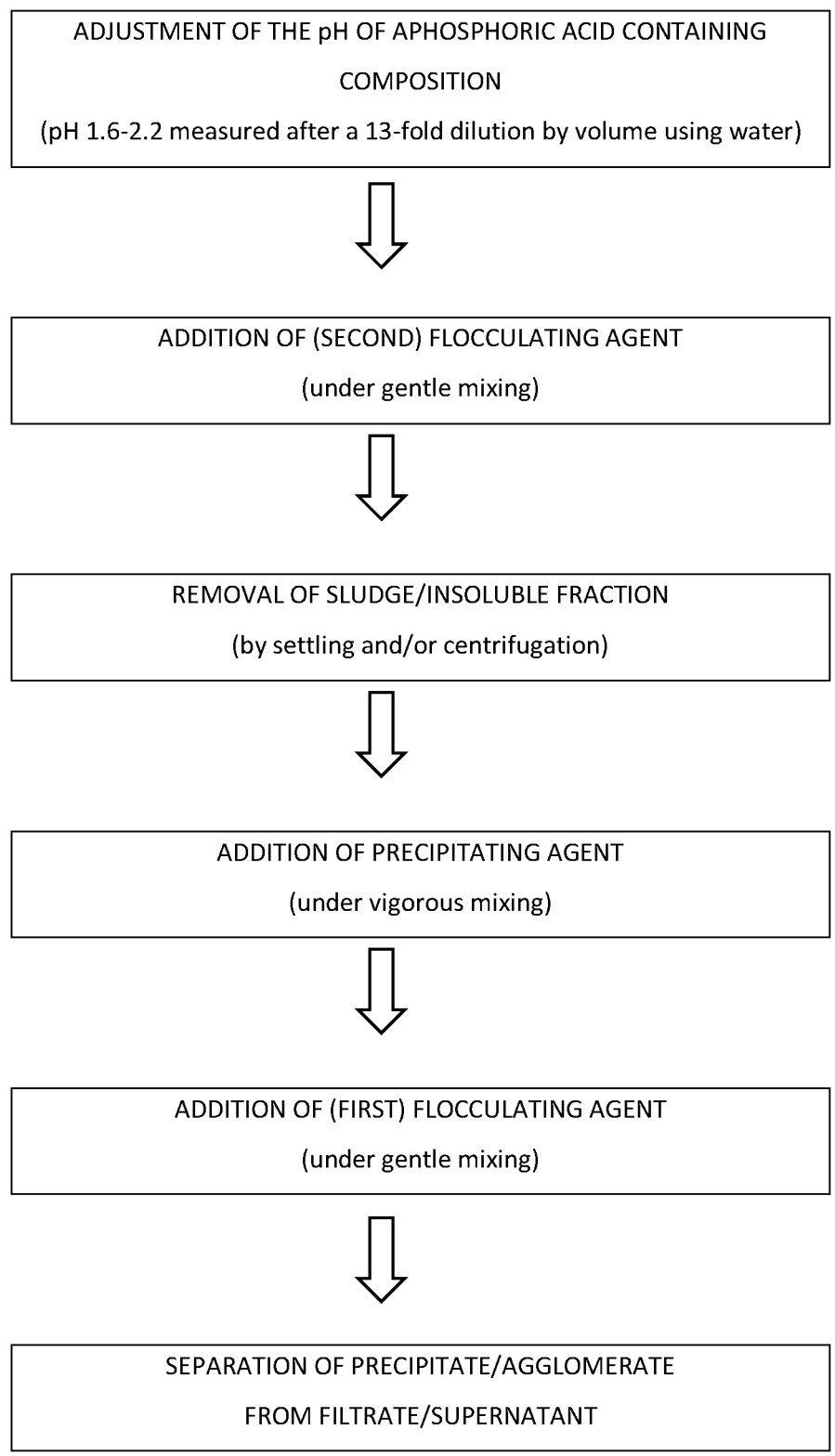
FIG. 3 schematically represents a particular embodiment of the method according to the present disclosure, comprising the steps, in sequence, of adjusting the pH of a phosphoric acid composition to 1.6-2.2 measured after a 13-fold dilution by volume using water, adding a second flocculating agent, removing a sludge fraction, adding a precipitating agent, adding a first flocculating agent and separating the precipitate from the filtrate/supernatant.

Before the present system and method of the invention are described, it is to be understood that this invention is not limited to particular systems and methods or combinations described, since such systems and methods and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

The term "about" or "approximately" as used herein when referring to a measurable value such as a parameter, an amount, a temporal duration, and the like, is meant to encompass variations of +/−10% or less, preferably +/−5% or less, more preferably +/−1% or less, and still more preferably +/−0.1% or less of and from the specified value, insofar such variations are appropriate to perform in the disclosed invention. It is to be understood that the value to which the modifier "about" or "approximately" refers is itself also specifically, and preferably, disclosed.

Whereas the terms "one or more" or "at least one", such as one or more or at least one member(s) of a group of members, is clear per se, by means of further exemplification, the term encompasses inter alia a reference to any one of said members, or to any two or more of said members, such as, e.g., any ≥3, ≥4, ≥5, ≥6 or ≥7 etc. of said members, and up to all said members.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may be. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those ordinary skilled in the art. For example, in the appended claims, any of the claimed embodiments can be used in any combination.

In the present description of the invention, reference is made to the accompanying drawings that form a part hereof, and in which are shown by way of illustration only of specific embodiments in which the invention may be practiced. It is to be understood that other embodiments may be utilised, and structural or logical changes may be made without departing from the scope of the present invention. The following detailed description, therefore, is not to be taken in a limiting sense, and the scope of the present invention is defined by the appended claims.

In the present disclosure, the concentration of the components comprised in a composition, when indicated as a percentage, is given as the percentage by weight with respect to the total weight of the composition, unless otherwise stated.

In the present disclosure, unless otherwise stated, the pH values are measured after a 13 times dilution by volume with water. Stated differently, the pH value is measured after mixing one volume of a non-diluted sample with 13 volumes of water.

In the present disclosure, unless explicitly stated otherwise, the terms "ionic polymer" or "ionic polymeric" as they relate to the flocculating agents considered herein, are in the meaning of macromolecules comprising multiple charged or ionic subunits. More specifically, the term "ionic polymer" or "ionic polymeric" as they relate to the flocculating agents considered herein is used synonymously for the terms "polyelectrolyte" or "polyelectrolytic", i.e. polymers, in particular polycations or polyanions, whose repeating units bear an electrolyte group. In the present disclosure, ionic poly(meth)acrylamide copolymers, such as cationic or anionic poly(meth)acrylamide copolymers, are particularly preferred.

The present disclosure provides improved methods for the removal of heavy metals, in particular cadmium, from an aqueous phosphoric acid containing composition, wherein a (first) flocculating agent is added to a phosphoric acid containing composition comprising heavy metal precipitates, or stated differently, is added to a phosphoric acid containing composition subsequently to the addition of a heavy metal precipitating agent. As used herein, the term "heavy metal" generally refers to those elements of the periodic table having a density of more than 5 g/cm³. Such heavy metal (or heavy metal ions) include, for example, one or more of cadmium, copper, nickel, mercury, zinc, arsenic, manganese and lead. The present disclosure is particularly directed for the removal of at least cadmium from compositions containing phosphoric acid. The term "phosphoric acid containing composition" may be any aqueous acidic solution or composition containing unrefined phosphoric acid, digestion slurries, filtered acid, and/or concentrated acid, as further discussed below.

According to one aspect of the present disclosure, a method is disclosed for the removal of heavy metals dissolved in a phosphoric acid containing composition, wherein the method comprises the steps of (a) providing a phosphoric acid containing composition comprising dissolved heavy metals, such as cadmium;

(b) precipitating the dissolved heavy metals by adding a heavy metal precipitating agent to the composition of step (a), at a pH of at least 1.6 measured after a 13-fold dilution by volume using water, thereby obtaining a heavy metal precipitate in a phosphoric acid containing composition, wherein the heavy metal precipitating agent comprises an organodithiophosphorous acid, in particular a diorganodithiophosphinic acid, or an alkali metal or ammonia salt thereof;

(c) adding a first flocculating agent to the composition obtained in step (b), wherein said first flocculating agent is a cationic polymer wherein 20% to 80%, particularly 20% to 60% or 30% to 50%, more particularly 35% to 45% of the moieties making up the cationic polymer are cationic charged moieties, an anionic polymer wherein 10% to 50%, particularly 10% to 40%, more particularly 15% to 30% of the moieties making up the anionic polymer are anionic charged moieties, or a mixture thereof, thereby obtaining agglomerates comprising the heavy metal precipitate in a phosphoric acid composition; and (d) separating the agglomerates comprising the heavy metal precipitate from the phosphoric acid containing composition.

In the context of the present disclosure, the phosphoric acid containing composition from which the heavy metals, in particular cadmium is to be removed, may be obtained by digesting a phosphate rock, a phosphate ore or a phosphate mineral with an acid. Such phosphate rock may contain high amounts of heavy metals, in particular cadmium, e.g. from 10 to 300 mg Cd/kg $P_2O_5$. The acid used in the digesting step may be nitric acid, sulfuric acid or a combination thereof.

In certain embodiments, the phosphoric acid containing composition comprises from 1 to 85 wt % phosphoric acid, particularly from 1 to 60 wt % phosphoric acid, more particularly from 10 to 60 wt %, such as from 20 to 60 wt % phosphoric acid, even more particularly from 10 to 40 wt % phosphoric acid, most particularly from 20 to 35 wt % or from 25 to 30 wt % phosphoric acid and dissolved heavy metals, such as cadmium. The phosphoric acid containing composition may comprise from 1 to 500 mg/l, more in particular from 1 to 250 mg/l, more in particular 1 to 100 mg/l dissolved cadmium.

In certain embodiments, the phosphoric acid containing composition is obtained by digesting a phosphate rock, a phosphate ore or a phosphate mineral with nitric acid at 65° C. In particular, the phosphoric acid containing composition comprises from 18 to 21 weight % nitric acid, from 25 to 29 weight % phosphoric acid and dissolved heavy metals, such as dissolved cadmium. More in particular, the phosphoric acid containing composition is obtained by the nitrophosphate process. More in particular, the phosphoric acid containing composition is the mother liquor obtained in the nitrophosphate process. In the nitrophosphate process, in a first step or digestion step, phosphate rock is digested in nitric acid at a temperature of 65° C., yielding a digestion liquor. In a second step or crystallization step, calcium nitrate tetrahydrate is crystallized out of the digestion liquor yielding a crystal slurry. In a third step or separation step, the crystallized calcium nitrate is separated by a technique such as filtration or centrifugation, resulting in calcium nitrate tetrahydrate crystals being separated from the liquid of the crystal slurry, referred to as the mother liquor.

In certain embodiments, the phosphoric acid containing composition is obtained by a mixed acid process, wherein nitric acid is used for acidulation of a phosphate rock, a phosphate ore or a phosphate mineral. Sulfuric acid is typically added to precipitate the calcium as calcium sulphate (gypsum), which is generally left in the slurry and acts as a diluent. Phosphoric acid may be added in order to adjust the water soluble phosphorous, depending on the grade being produced.

In the context of the present disclosure, the organothiophosphorous heavy metal precipitating agent comprises a diorgano-dithiophosphinic acid or an alkali metal or ammonia salt thereof, represented by Formula 1

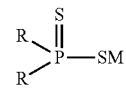

Formula 1 wherein R is a linear or branched hydrocarbon group selected from alkyl, aryl, alkylaryl, or aralkyl, and wherein the hydrocarbon group contains 3 to 20 carbon atoms, and M is H, alkali metal or ammonia. Preferred examples of the hydrocarbon groups R in the diorgano dithiophosphinic acid (or alkali metal or ammonia salts thereof) according to formula 1 include, but are not limited to, linear or branched alkyl, cycloalkyl, alkylaryl, aralkyl having from 3-20 carbon atoms. More preferably, suitable hydrocarbon groups include, but are not limited to, cyclohexyl, isopropyl, isobutyl, n-propyl, octyl, hexyl, phenylethyl, and 2,4,4-trimethyl pentyl. Even more preferably, the diorgano-dithiophosphinic acid (or salt thereof) used in the present invention as heavy metal precipitation agent is di-isobutyl dithiophosphinate. In a preferred embodiment, the precipitating agent is sodium di-isobutyl dithiophoshinate.

In particularly preferred embodiments, the heavy metal precipitating agent consists of a diorgano-dithiophosphinic acid or an alkali metal or ammonia salt thereof, represented by Formula 1, such as consists of di-isobutyl dithiophosphinate, i.e. no surfactants or other compounds are added simultaneously with the organodithiophosphorous heavy metal precipitating agent as envisaged herein.

Generally, the heavy metal precipitating agent can be prepared according to the procedure described in U.S. Pat. No. 4,308,214 and the corresponding examples by heating 67.2 parts of sulfur 114.8 to 284.8 parts of water to a temperature of about 70° C. To the mixture are then steadily metered in 29.5 to 64.5 parts of the commercially available di-phosphine. After the di-phosphine has been metered, an additional 67.5 to 193.5 additional parts of diethyl phosphine are metered in at a rate such that within the time necessary to meter in all of the diethylphosphine, 80.0 parts of a 50% solution of sodium hydroxide are also metered in at a constant rate to neutralize the corresponding dithiophosphinic acid that forms.

In certain embodiments, the heavy metal precipitating agent is added in an amount ranging from 10 µg to 1 mg per g of the phosphoric acid containing composition, particularly from 50 µg to 0.75 mg per g of the phosphoric acid containing composition, more particularly ranging from 0.2 to 0.6 mg or from 0.3 mg to 0.6 mg per g of the phosphoric acid containing composition.

According to an embodiment of the present disclosure, the reaction with the heavy metal precipitating agent as envisaged herein may be performed for 3 minutes to 1.5 hour, for 5 minutes to one hour, or for 10 to 30 minutes. The skilled person understands that the reaction with the heavy metal precipitating agent as envisaged herein is particularly performed under vigorous mixing conditions, in particular at mixing speeds of 500 to 700 rpm. According to an embodiment of the present disclosure, the reaction with the heavy metal precipitating agent as envisaged herein may be performed at temperature ranging from 5° C. to 80° C., in particular at a temperature from 5° C. to 50° C., more particularly are performed at a temperature of 5° C. to 40° C. As the heavy metal precipitate may be less stable at temperatures above 40° C., it may be desirable to perform the reaction with the heavy metal precipitating agent for less than 10 minutes at higher temperatures. Stated differently, at temperatures of 40° C. to 50° C. or higher, step c) is preferably performed 3 to 10 min after step b) to prevent unwanted degradation of the precipitate at higher temperatures. Performing the precipitation at lower temperatures is beneficial for the stability of the precipitating agent, but may require more time for the precipitate to form.

In the present disclosure, heavy metal precipitation is promoted by the addition of a first flocculating agent, particularly an ionic polymeric flocculating agent, to the composition comprising heavy metal precipitates. Said first flocculating agent is a cationic polymer, an anionic polymer or a mixture thereof, wherein 20% to 80%, particularly 20% to 60% or 30% to 50%, more particularly 35% to 45% of the moieties making up the cationic polymer are cationic charged moieties, and wherein 10% to 50%, particularly 10% to 40%, more particularly 15% to 30% of the moieties making up the anionic polymer are anionic charged moieties. Stated differently, the first flocculating agent is added after the addition of the heavy metal precipitating agent and after heavy metal precipitates have been formed. The flocculating agent induced formation of larger agglomerates promotes the separation of the precipitates, comprising the heavy metal (cadmium) complexed with the heavy metal precipitation agent, from the aqueous phosphoric acid containing composition. The skilled person understands that the flocculating agent induced agglomerate formation is best performed under gentle mixing conditions, in particular at mixing speeds of 100 rpm to 300 rpm. This way, sufficient shear forces are applied to build agglomerates by collision of the metal precipitates and ionic charge attraction. Too high shear forces may overcome ionic charge attraction and thus not allow agglomeration. In certain embodiments, the flocculation step c) is performed at the same temperature and pH conditions as the precipitation step b).

For the anionic or cationic polymeric flocculating agents considered herein, the ionic charge value may also be referred to as the degree of anionicity or the degree of cationicity, respectively. In certain embodiments, the first flocculating agent is an ionic acrylamide copolymer or an ionic methacrylamide copolymer. As used herein, the term "ionic acrylamide copolymer", "ionic polyacrylamide", "ionic methacrylamide copolymer" or "ionic polymethacrylamide" refers to a polymer comprising acrylamide or methacryl amide subunits and additionally comprising subunits comprising an ionic charge. Cationic acrylamide copolymers or cationic methacrylamide copolymers comprise subunits having a cationic charge, particularly comprising a quaternary nitrogen atom, such as comprising ADAM or MADAM subunits, i.e. dimethylaminoethyl acrylate or dimethylaminoethyl methacrylate subunits. Anionic acrylamide copolymers or anionic methacrylamide copolymers comprise subunits having an anionic charge, particularly comprising a carboxylate or sulphonate functional group, such as comprising acrylic acid or methacrylic acid subunits, or styrene sulphonate subunits.

A particularly preferred cationic flocculating agent is a copolymer of acrylamide or methacrylamide and a chloromethylated monomer, such as dimethylaminoethyl methacrylate (MADAM) or dimethylaminoethyl acrylate (ADAM) monomers. A particularly preferred anionic flocculating agent is a copolymer of acrylamide or methacrylamide and acrylic acid or methacrylic acid.

In certain embodiments, the polymeric flocculating agent has a MW ranging from $3\times10^6$ Dalton to $14\times10^6$ Dalton, particularly from $4\times10^6$ Dalton to $12\times10^6$ Dalton, more particularly from $4\times10^6$ Dalton to $8\times10^6$ Dalton. The polymeric flocculating agent may be a linear molecule or a branched molecule.

In certain embodiments, the flocculating agent is added in a dose of 3 to 30 g/m³ acid composition, particularly in a dose of 3 to 20 g/m³ acid composition, such as in a dose of 5 to 20 g/m³ or 10 to 20 g/m³ acid composition.

In certain embodiments, the phosphoric acid containing composition may be subjected to one or more pretreatments, prior to the addition of the precipitating agent and the first flocculating agent, as represented in FIG. 1, FIG. 2 and FIG. 3. Such pretreatments include pH adjustment (FIG. 1-FIG. 3) and/or separating an insoluble fraction (sludge) (FIG. 2 and FIG. 3) from the phosphoric acid containing composition.

In certain embodiments, removal of the insoluble fraction (sludge) may comprise the addition of a second flocculating agent to the phosphoric acid containing composition after the pH adjustment step, in order to facilitate the separation of the insoluble fraction from the phosphoric acid containing composition (FIG. 3).

In particular, according to an embodiment of the present disclosure, step (a) further comprises the steps of (i) adjusting the pH of a phosphoric acid containing composition comprising dissolved heavy metals to a pH of at least pH 1.6 measured after a 13-fold dilution by volume using water, thereby obtaining a phosphoric acid containing composition comprising a sludge fraction;

(ii) optionally adding a second flocculating agent to the composition of step (i), wherein said second flocculating agent is a cationic polymer wherein 20% to 80%, particularly 20% to 60% or 30% to 50%, more particularly 35% to 45% of the moieties making up the cationic polymer are cationic charged moieties, an anionic polymer wherein 10% to 50%, particularly 10% to 40%, more particularly 15% to 30% of the moieties making up the anionic polymer are anionic charged moieties, or a mixture thereof;

(iii) separating the sludge fraction from the composition of step (i) or (ii).

In the context of present disclosure, the pH of the phosphoric acid containing composition may be adjusted prior to the addition of the heavy metal precipitating agent to a pH of at least 1.6, in particular between 1.6 and 2.2 measured after a 13-fold dilution by volume using water, or between 1.6 and 2.0 measured after a 13-fold dilution by volume using water, thereby obtaining a phosphoric acid containing composition comprising a sludge fraction. At this pH, heavy metal precipitation, particularly cadmium precipitation, using an organothiophosphorous acid according to Formula 1 as envisaged herein, or an alkali metal or ammonia salt thereof, is especially effective. In addition, at these pH conditions, precipitation of phosphorous salts, in particular dicalcium phosphate ($CaHPO_4$) is minimized, thereby minimizing phosphorous losses and maintaining the content of phosphorous in the phosphoric acid composition and, hence, in the final product. In certain embodiments, the pH of the aqueous phosphoric acid containing composition is adjusted using gaseous ammonia. Advantageously, particularly when the phosphoric acid containing composition comprises nitric acid, no other chemical elements are introduced other than nitrogen and hydrogen already present in the nitric acid, such that a very pure NP-end product may be obtained.

In certain embodiments, at least part of the insoluble components or sludge present in the phosphoric acid containing composition, particularly the phosphoric acid containing composition after pH adjustment may be removed prior to the addition of the heavy metal precipitating agent. More in particular, a cationic polymer wherein 20% to 80%, particularly 20% to 60% or 30% to 50%, more particularly 35% to 45% of the moieties making up the cationic polymer are cationic charged moieties, an anionic polymer wherein 10% to 50%, particularly 10% to 40%, more particularly 15% to 30% of the moieties making up the anionic polymer are anionic charged moieties, or a mixture thereof as a second flocculating agent may be added to the phosphoric acid containing composition, particularly the phosphoric acid containing composition after pH adjustment, to promote the agglomeration and precipitation of the insoluble components or sludge fraction (FIG. 3). Surprisingly, the removal of insoluble components or sludge before the addition of the heavy metal precipitating agent did not affect the heavy metal precipitation efficiency of the method. Moreover, the separation of part of the sludge and insoluble components, such as aided by flocculation, prior to heavy metal precipitation, in particular cadmium precipitation, facilitates the cadmium extraction from the composition comprising phosphoric acid. Advantageously, in this way, a smaller amount of the heavy metal precipitating agent as envisaged herein may be added to the phosphoric acid containing composition and the resulting heavy metal containing precipitates comprise a higher concentration of heavy metals, in particular cadmium.

The second flocculating agent may be the same or different than the first flocculating agent.

In particular embodiments, the second flocculating agent is a copolymer of acrylamide or methacrylamide.

According to particular embodiments of the present disclosure, cationic polymers, more in particular cationic acrylamide or methacryl amide based copolymers, with a positive charge ranging from 30% to 50%, are especially suitable for the purpose of agglomerating and separating both the sludge and insoluble components prior to the addition of the heavy metal precipitating agent, as well as the heavy metal precipitates formed after addition and mixing of the heavy metal precipitating agent to the phosphoric acid containing composition. In particular, a polymer of (meth)acrylamide and a chloro-methylated monomer may be used. Examples of suitable cationic polymers include, but are not limited to, 40% linear cationic powder polyacrylamide (that is a polyacrylamide having 40% of its moieties positively charged) with molecular weight ranging from 4.8 to $7.6*10^6$ Dalton, 40% linear cationic powder polyacrylamide (that is a polyacrylamide having 40% of its moieties positively charged) with molecular weight ranging from 7.1 to $9.5*10^6$ Dalton or 40% linear cationic powder polyacrylamide (that is a polyacrylamide having 40% of its moieties positively charged) with molecular weight ranging from 9.5 to $12.1*10^6$ Dalton.

According to particular embodiments of the present disclosure, anionic polymers, more in particular anionic acrylamide or methacryl amide based copolymers, with a anionic charge ranging from 15% to 30%, are especially suitable for the purpose of agglomerating and separating both the sludge and insoluble components prior to the addition of the heavy metal precipitating agent, as well as the heavy metal precipitates formed after addition and mixing of the heavy metal precipitating agent to the phosphoric acid containing composition. In particular, a polymer of (meth)acrylamide and (meth)acrylic acid may be used. Examples of suitable anionic polymers include, but are not limited to, 20% linear anionic emulsion polyacrylamide (that is a polyacrylamide having 20% of its moieties negatively charged) with molecular weight ranging from 9.7 to $17.5*10^6$ Dalton or 20 mole % linear anionic powder polyacrylamide (that is a polyacrylamide having 20% of its moieties negatively charged) with molecular weight ranging from 12.2 to $17.5*10^6$ Dalton.

The separation of the sludge may be accomplished by any standard technology for separation such as, but not limited to, filtration, centrifugation, sedimentation, flotation or decantation. In certain embodiments, the separation of the precipitated insoluble or sludge fraction due to the addition of the second flocculating agent is performed by centrifugation. In particular embodiments, the precipitated insoluble or sludge fraction is subject to a pre-concentration step prior to centrifugation, wherein at least part of the liquid is separated from the precipitated sludge fraction. For instance, such pre-concentration step may be a settling step, wherein the sludge agglomerates settle, so that the liquid can be separated, such as by decantation, prior to centrifugation. Advantageously, this way, the amount of the composition to be centrifuged, particularly the amount of liquid, is reduced and the centrifugation step is rendered more efficient, as the solids/liquid separation in the centrifugation is more easily achieved.

Accordingly, in particular embodiments, a method is provided for the removal of heavy metals dissolved in a phosphoric acid containing composition, wherein the method comprises the steps of (a)(i) providing a phosphoric acid containing composition comprising dissolved heavy metals, such as cadmium, and adjusting the pH of a phosphoric acid containing composition comprising dissolved heavy metals to a pH of at least pH 1.6 measured after a 13-fold dilution by volume using water, in particular a pH of 1.6 to 2.0 measured after a 13-fold dilution by volume using water, or a pH 1.6 to 2.2 measured after a 13-fold dilution by volume using water, thereby obtaining a phosphoric acid containing composition comprising a sludge fraction;

(a)(ii) adding a cationic polymer wherein 20% to 80%, particularly 20% to 60% or 30% to 50%, more particularly 35% to 45% of the moieties making up the cationic polymer are cationic charged moieties, an anionic polymer wherein 10% to 50%, particularly 10% to 40%, more particularly 15% to 30% of the moieties making up the anionic polymer are anionic charged moieties, or a mixture thereof as a second flocculating agent, particularly an cationic polymeric flocculating agent wherein 35% to 45% of the moieties making up the cationic polymer are cationic charged moieties, to the composition of step (a)(i), thereby obtaining sludge agglomerates, and, optionally, removing part of a liquid fraction;

(a)(iii) removing the sludge agglomerates from the composition of step (a)(ii), particularly by centrifugation;

(b) precipitating the dissolved heavy metals by adding a heavy metal precipitating agent to the composition of step (a), at a pH of at least 1.6 measured after a 13-fold dilution by volume using water, in particular a pH of 1.6 to 2.0 measured after a 13-fold dilution by volume using water, or a pH 1.6 to 2.2 measured after a 13-fold dilution by volume using water, thereby obtaining a heavy metal precipitate in a phosphoric acid containing composition, wherein the heavy metal precipitating agent comprises an diorgano-dithiophosphinic acid according to Formula 1 as envisaged herein, or an alkali metal or ammonia salt thereof;

(c) adding a cationic polymer wherein 20% to 80%, particularly 20% to 60% or 30% to 50%, more particularly 35% to 45% of the moieties making up the cationic polymer are cationic charged moieties, an anionic polymer wherein 10% to 50%, particularly 10% to 40%, more particularly from 15% to 30% of the moieties making up the anionic polymer are anionic charged moieties, or a mixture thereof as a first flocculating agent, particularly an cationic polymer 35% to 45% of the moieties making up the cationic polymer are cationic charged moieties, to the composition obtained in step (b), thereby obtaining agglomerates comprising the heavy metal precipitate in a phosphoric acid containing composition; and (d) separating the agglomerates comprising the heavy metal precipitate from the phosphoric acid containing composition of step (c), particularly by centrifugation.

According to an embodiment of the present disclosure, the precipitation step (b) and/or flocculation steps (c) and (a)(ii) are performed at a temperature of 5° C. to 50° C., particularly are performed at a temperature of 5° C. to 40° C. Particular good results were obtained at a temperature ranging from 10° C. to 35° C. or 10 to 30° C. These temperatures in combination with the above indicated pH conditions of 1.6 to 2.0 measured after a 13-fold dilution by volume using water, benefit the stability of the heavy metal precipitating agent in the phosphoric acid containing composition as envisaged herein. These conditions were also found to be optimal for flocculation and precipitation of the non-phosphate insoluble or sludge fraction in the phosphoric acid containing composition prior to and after the precipitation step (b). Certain embodiments of the present disclosure include adjusting the temperature of the phosphoric acid containing composition to a temperature of 5° C. to 50° C., particularly to a temperature of 5° C. to 40° C., more particularly to a temperature of 10° C. to 35° C. or 10° C. to 30° C., by natural cooling or by heat exchangers.

In the context of the present disclosure, the separation in step d) or step a)(iii) may be accomplished by state of the art technology for liquid-solid separation such as, but not limited to, centrifugation and/or decantation. Separation by centrifugation is particularly preferred. Although some of the agglomerates have been found to be quite fragile, separation of the flocculants by centrifugation was surprisingly effective.

Another aspect of the present disclosure provides a method for preparing a fertilizer, particularly a nitrogen fertilizer, comprising the steps of Digesting phosphate rock with nitric acid, thereby obtaining a composition comprising phosphoric acid and calcium nitrate;

Removing heavy metals from the composition comprising phosphoric acid according to any embodiment of the methods envisaged herein; in particular comprising the steps of optionally removing a sludge fraction by flocculation with a second flocculating agent and precipitation; precipitating the dissolved heavy metals, such as cadmium, by adding a heavy metal precipitating agent to the phosphoric acid containing composition, at a pH of at least 1.6 measured after a 13-fold dilution by volume using water, in particular a pH of 1.6 to 2.0 measured after a 13-fold dilution by volume using water, or a pH 1.6 to 2.2 measured after a 13-fold dilution by volume using water, wherein the heavy metal precipitating agent comprises a diorgano-dithiophosphinic acid according to formula 1 or an alkali metal or ammonia salt thereof; subsequently adding a first flocculating agent to the composition comprising heavy metal precipitates, particularly under gentle mixing conditions, such as at mixing speeds of 100 to 300 rpm, thereby obtaining agglomerates comprising the heavy metal precipitate in a phosphoric acid containing composition; and separating the agglomerates comprising the heavy metal precipitate from the phosphoric acid containing composition.

Further adjusting the pH of the phosphoric acid containing composition to approximately pH 5.8 using gaseous ammonia;

optionally, adding potassium salts to the phosphoric acid containing composition with pH 5.8;

particulating the phosphoric acid containing composition with pH 5.8 and optionally comprising potassium salts, and, further, optionally, coating and/or coloring the particles.

In this manner, it is possible to obtain, from the nitrophosphate process, coated or non-coated, colored on non-colored NP or NPK particles with reduced amounts of heavy metals, such as cadmium. It will be evident to the person skilled in the art that the method of the disclosure can be applied on the total aqueous composition resulting from the digestion step or only on part of the digestion liquor. In the latter case, the part of the digestion liquor which is not treated according to a method of the present disclosure is mixed with or diluted with the part of the digestion liquor which has been treated according to a method of the present disclosure, such that the heavy metal (cadmium) levels of the combined composition is below a desired value, particularly remains within the regulatory limits.

Another aspect of the present disclosure provides for the use of a flocculating agent as envisaged in the present disclosure, for flocculating heavy metal precipitates in a phosphoric acid containing composition, wherein the heavy metal precipitate is a heavy metal precipitated from a phosphoric acid composition with a diorgano-dithiophosphinic acid or an alkali metal or ammonia salt thereof, represented by Formula 1 above, as the heavy metal precipitating agent.

EXAMPLES

Example 1—Effect of a Polymeric Flocculating Agent

The pH of cadmium-containing mother liquor (ML), freshly produced from the Odda nitro-phosphate process, was adjusted to pH=1.8, using gaseous ammonia (NH$_3$). The pH was measured after a 13-fold dilution by volume using water.

The used mother liquor comprised 5.14 wt % Ca (as measured by Atomic Absorption Spectroscopy), 7.4 wt % P (as measured by gravimetry P), 34.2 wt % H$_2$O (as measured by Karl Fisher titration) and 6 ppm Cd, and 15.2 ppm Cu (as measured by ICP-OES). It is understood that the percentages and amounts as they relate to the ML composition are merely an indication of such composition and are not limiting for the process considered herein.

The resulting composition was centrifuged for (2440 rpm, 2 min, 1000 G) to reduce the amount of sludge.

Sodium diisiobutyl dithiophosphinate (DTPINa, 3.56%, 0.336 g) was added to the mother liquor at pH=1.8 (60 g) under vigorous stirring (600 rpm). The mixture was stirred for 3 min, after which a polymeric flocculating agent (40% linear cationic powder polyacrylamide (that is a polyacrylamide having 40% of its moieties positively charged) with a molecular weight ranging from 7.1 to 9.5*10$^6$ Dalton, 0.1 wt % concentration, 0.078 g, 600 rpm) was added during intense stirring. Immediately after addition of the flocculating agent, stirring was reduced to 150 rpm in order to allow agglomerate formation. After 3 min of flocculation/agglomerate formation, the mixture was centrifuged (2440 rpm, 2 min, 1000 G) and the supernatant and sludge/precipitate were separated.

In addition, a sample of the supernatant was taken using a syringe with 5 μm filter in order to investigate the effect of separation efficiency using a centrifuge. The cadmium and heavy metal content was analysed by ICP-OES (Thermo Scientific, iCAP 7400 Duo, wavelength: 226.502 nm Cd, 204.379 nm for Cu and 206.200 nm for Zn all in axial mode). The Cd-extraction efficiency of Cd-precipitation by DTPINa followed by flocculation was calculated to be 84%. The Cu-extraction efficiency was also calculated to be 84%.

Example 2—Comparative Example No Polymeric Flocculating Agents

In a comparative example, no flocculating agent was added after the addition of DTPINa. More in particular, the pH of a cadmium-containing mother liquor freshly produced from the Odda nitro-phosphate process (same composition as above) was adjusted to 1.8 (measured after a 13-fold dilution by volume using water) using gaseous ammonia (NH$_3$). The resulting composition was centrifuged for (2440 rpm, 2 min, 1000 G). DTPINa (3.56%, 0.336 g) was added to the mother liquor at pH 1.8 (60 g) under vigorous stirring (600 rpm). After 3 min of reaction the mixture, the resulting composition was centrifuged for (2440 rpm, 2 min, 1000 G) and the supernatant and precipitate were separated. The cadmium and heavy metal content were analyzed by ICP-OES (Thermo Scientific, iCAP 7400 Duo, wavelength: 226.502 nm for Cd 204.379 nm; and 206.200 nm for Cu). The addition of DTPINa without a flocculant resulted in a Cd-extraction efficiency of about 73%, and a Cu-extraction efficiency of 78%.

The addition of a flocculating agent after the heavy metal precipitating agent thus increased the heavy metal (Cd and Cu) extraction from the mother liquor at pH 1.8.

Example 3—Extraction of Heavy Metals from Another Composition

The pH of cadmium-containing mother liquor (ML), freshly produced from the Odda nitro-phosphate process, was adjusted to pH=1.8, using gaseous ammonia (NH$_3$). The pH was measured after a 13-fold dilution by volume using water.

The used mother liquor comprised 6.52 wt % Ca (as measured by Atomic Absorption Spectroscopy), 11.6 wt % P (as measured by gravimetry P), 34.78 wt % H$_2$O (as measured by Karl Fisher titration) and 3.5 ppm Cd, 12.3 ppm Cu, 97.4 ppm Zn (as measured by ICP-OES). It is understood that the percentages and amounts as they relate to the ML composition are merely an indication of such composition and are not limiting for the process considered herein.

The resulting composition was centrifuged for (2440 rpm, 2 min, 1000 G) to reduce the amount of sludge.

Sodium diisiobutyl dithiophosphinate (DTPINa, 3.56%, 0.34 g) was added to the mother liquor at pH=1.8 (60 g) under vigorous stirring (600 rpm). The mixture was stirred for 3 min, after which a polymeric flocculating agent (40% cationic polyacrylamide (that is a polyacrylamide having 40% of its moieties positively charged) with molecular weight of from 8-9.5 10$^6$ Dalton, 0.1 wt % concentration, 0.078 g, 600 rpm) was added during intense stirring. Immediately after addition of the flocculating agent, stirring was reduced to 150 rpm in order to allow agglomerate formation. After 3 min of flocculation/agglomerate formation, the mixture was centrifuged (2440 rpm, 2 min, 1000 G) and the supernatant and sludge/precipitate were separated.

In addition, a sample of the supernatant was taken using a syringe with 5 μm filter in order to investigate the effect of separation efficiency using a centrifuge. The cadmium and heavy metal content was analysed by ICP-OES (Thermo Scientific, iCAP 7400 Duo, wavelength: 226.502 nm for Cd, 204.379 nm for Cu and 206.200 nm for Zn all in axial mode). The Cd-extraction efficiency of Cd-precipitation by DTPINa followed by flocculation was calculated to be 63%. The Cu-extraction efficiency was calculated to be 77% and the Zn-extraction efficiency was calculated to be 22%.

Example 4—Effect of No Sludge Removal from Neutralised Liquor

The pH of cadmium-containing mother liquor (ML), freshly produced from the Odda nitro-phosphate process, was adjusted to pH=1.8, using gaseous ammonia (NH$_3$). The pH was measured after a 13-fold dilution by volume using water.

The used mother liquor comprised 3.9 wt % Ca (as measured by ICP-OES), 8.5 wt % P (as measured by ICP-OES), 32.7 wt % H$_2$O (as measured by Karl Fisher titration) and 1.4 ppm Cd, 12.4 ppm Cu, 34.1 ppm Zn, (as measured by ICP-OES). It is understood that the percentages and amounts as they relate to the ML composition are merely an indication of such composition and are not limiting for the process considered herein.

The resulting composition was then used as is.

Sodium diisiobutyl dithiophosphinate (DTPINa, 3.56%, 8 g) was added to the mother liquor at pH=1.8 (500 g) under vigorous stirring (600 rpm). The mixture was stirred for 3 min, after which a polymeric flocculating agent (40% cationic polyacrylamide (that is a polyacrylamide having 40% of its moieties positively charged) with molecular weight of from 8-9.5 10$^6$ Dalton, 0.1 wt % concentration, 1.5 g, 600 rpm) was added during intense stirring. Immediately after addition of the flocculating agent, stirring was reduced to 150 rpm in order to allow agglomerate formation. After 3 min of flocculation/agglomerate formation, the mixture was centrifuged (2440 rpm, 2 min, 1000 G) and the supernatant and sludge/precipitate were separated.

In addition, a sample of the supernatant was taken using a syringe with 5 µm filter in order to investigate the effect of separation efficiency using a centrifuge. The cadmium and heavy metal content was analysed by ICP-OES (Thermo Scientific, iCAP 7400 Duo, wavelength: 226.502 nm for Cd, 204.379 nm for Cu and 206.200 nm for Zn all in axial mode). The Cd-extraction efficiency of Cd-precipitation by DTPINa followed by flocculation was calculated to be 92%, the Cu-extraction efficiency was calculated to be 92% and the Zn-extraction efficiency was calculated to be 82.5%.

Example 5—Effect of Sludge Removal

The pH of cadmium-containing mother liquor (ML), freshly produced from the Odda nitro-phosphate process, was adjusted to pH=1.8, using gaseous ammonia ($NH_3$). The pH was measured after a 13-fold dilution by volume using water.

The used mother liquor comprised 3.9 wt % Ca (as measured by ICP-OES), 8.5 wt % P (as measured by ICP-OES), 32.7 wt % $H_2O$ (as measured by Karl Fisher titration) and 1.4 ppm Cd, 12.4 ppm Cu, and 34.1 ppm Zn (as measured by ICP-OES). It is understood that the percentages and amounts as they relate to the ML composition are merely an indication of such composition and are not limiting for the process considered herein.

The resulting composition was centrifuged for (2440 rpm, 2 min, 1000 G) to reduce the amount of sludge.

Sodium diisiobutyl dithiophosphinate (DTPINa, 3.56%, 5.5 g) was added to the mother liquor at pH=1.8 (343.6 g) under vigorous stirring (600 rpm). The mixture was stirred for 3 min, after which a polymeric flocculating agent (40% cationic polyacrylamide (that is a polyacrylamide having 40% of its moieties positively charged) with molecular weight of from 8-9.5 $10^6$ Dalton, 0.1 wt % concentration, 1.06 g, 600 rpm) was added during intense stirring. Immediately after addition of the flocculating agent, stirring was reduced to 150 rpm in order to allow agglomerate formation. After 3 min of flocculation/agglomerate formation, the mixture was centrifuged (2440 rpm, 2 min, 1000 G) and the supernatant and sludge/precipitate were separated.

In addition, a sample of the supernatant was taken using a syringe with 5 µm filter in order to investigate the effect of separation efficiency using a centrifuge. The cadmium and heavy metal content was analysed by ICP-OES (Thermo Scientific, iCAP 7400 Duo, wavelength: 226.502 nm Cd, 204.379 nm for Cu and 206.200 nm for Zn all in axial mode). The Cd-extraction efficiency of Cd-precipitation by DTPINa followed by flocculation was calculated to be 78%, the Cu-extraction efficiency was calculated to be 66% and the Zn-extraction efficiency was calculated to be 78%.

Example 6—Effect of the pH

To study the effect of pH on the heavy metal (in particular Cd, Cu and Zn) extraction efficiency, the pH of a mother liquor was adjusted to different pH values (pH 1.1-2.4) measured after a 13-fold dilution by volume using water. Below pH 1.6 (measured after a 13-fold dilution by volume using water), only about 7-9% of the Cd, 8-14% of Cu and 7% of Zn was precipitated by the DTPINa compound. In contrast, at pH values above pH 1.6 (measured after a 13-fold dilution by volume using water), the Cd removal efficiency increased to about 96%, Cu-extraction increased to 88% and Zn-extraction increased to 22%. At pH 2.2 (measured after a 13-fold dilution by volume using water), the Cd removal is still very high (ca. 90%), and Cu-extraction is 81% and Zn-extraction is 41%. However, the separation step becomes the limiting factor, as the increasing viscosity renders the separation by centrifugation less efficient.

Example 7—Different Polymeric Flocculating Agents

Different polymers were screened to find the most efficient flocculation agent to separate the precipitated heavy metals, in particular Cd, from a mother liquor composition after pH adjustment. The tested polymers differed in their charge (cationic, non-ionic, anionic (low and high %), molecular weight (middle and high MW), type (emulsion, powder) and structure (linear, branched).

The tested flocculants include:
—cationic polyacrylamide (PAM) copolymers with charge of:
  20% linear cationic emulsion polyacrylamide (that is a polyacrylamide having 20% of its moieties positively charged) with molecular weight ranging from 5.9 to 9.9*$10^6$ Dalton;
  30% linear cationic emulsion polyacrylamide (that is a polyacrylamide having 30% of its moieties positively charged) with molecular weight ranging from 5.9 to 9.9*$10^6$ Dalton;
  30% structured cationic emulsion polyacrylamide (that is a polyacrylamide having 30% of its moieties positively charged) with low molecular weight;
  30% structured cationic emulsion polyacrylamide (that is a polyacrylamide having 30% of its moieties positively charged) with fairly high molecular weight;
  35% linear cationic powder polyacrylamide (that is a polyacrylamide having 35% of its moieties positively charged) with molecular weight ranging from 7.5 to 9.2*$10^6$ Dalton;
  40% linear cationic emulsion polyacrylamide (that is a polyacrylamide having 40% of its moieties positively charged) with molecular weight ranging from 5.9 to 9.9*$10^6$ Dalton;
  40% linear cationic powder polyacrylamide (that is a polyacrylamide having 40% of its moieties positively charged) with molecular weight ranging from 4.8 to 7.6*$10^6$ Dalton;
  40% linear cationic powder polyacrylamide (that is a polyacrylamide having 40% of its moieties positively charged) with molecular weight ranging from 9.5 to 12.1*$10^6$ Dalton;
  40% linear cationic powder polyacrylamide (that is a polyacrylamide having 40% of its moieties positively charged) with molecular weight ranging from 7.1 to 9.5*$10^6$ Dalton;
  45% linear cationic powder polyacrylamide (that is a polyacrylamide having 45% of its moieties positively charged) with molecular weight ranging from 4.2 to 7.1*$10^6$ Dalton;
  50% linear cationic emulsion polyacrylamide (that is a polyacrylamide having 50% of its moieties positively charged) with molecular weight ranging from 6.4 to 9.5*$10^6$ Dalton;
  60% linear cationic emulsion polyacrylamide (that is a polyacrylamide having 50% of its moieties positively charged) with molecular weight ranging from 6.4 to 9.6*$10^6$ Dalton.

—anionic polyacrylamide copolymers with charge of:
  5% linear anionic emulsion polyacrylamide (that is a polyacrylamide having 5% of its moieties negatively charged) with molecular weight ranging from 6.8 to 13.9*10$^6$ Dalton;
  10% linear anionic emulsion polyacrylamide (that is a polyacrylamide having 10% of its moieties negatively charged) with molecular weight ranging from 8.5 to 16.1*10$^6$ Dalton;
  20% linear anionic emulsion polyacrylamide polyacrylamide (that is a polyacrylamide having 20% of its moieties negatively charged) with molecular weight ranging from 9.7 to 17.5*10$^6$ Dalton;
  30% linear anionic emulsion polyacrylamide (that is a polyacrylamide having 30% of its moieties negatively charged) with molecular weight ranging from 17.5 to 23.0*10$^6$ Dalton;
  50% linear anionic emulsion polyacrylamide polyacrylamide (that is a polyacrylamide having 50% of its moieties negatively charged) with very high molecular weight.

The experimental procedure consisted of the steps of:
1. Adjustment of the pH of the mother liquor, particularly prepared according to the Odda or nitrophosphate process, to a pH of 1.8 (measured after a 13-fold dilution by volume using water) by ammonia addition and cooling of the resulting mother liquor to a temperature of 24° C.;
2. Centrifugation to remove the sludge fraction present in the mother liquor at pH 1.8 (2440 rpm; for 2 min);
3. Addition of the heavy metal precipitating agent (1200 ppm of 5% sodium di-isobutyl dithiophosphinate solution (1.2 g)) to the mother liquor at pH 1.8 (50 g) under vigorous stirring using a magnetic stirrer for 3 min;
4. Addition of the flocculating agent (10-30 ppm) and agglomerate formation under gentle stirring (with plastic spoon);
5. Separation of the precipitated and agglomerated material by centrifugation;
6. Analysis of the heavy metal content (Cd) of the supernatant by ICP-OES ((Thermo Scientific, iCAP 7400 Duo, wavelength: 226.502 nm in an axial mode).

7.1 Cationic Polymers

The Cd extraction efficiency of polyacrylamide based cationic polymeric flocculants with a cationic charge between 20% and 60% (that is a polyacrylamide having 20-60% of its moieties positively charged, in emulsion (EM)) and between 35% and 45% (that is a polyacrylamide having 35-45% of its moieties positively charged, in powder form (FO)) were investigated Both the EM and FO type flocculating agents were prepared as a 0.5 wt % solution and were further diluted to a 0.1 wt % solution before addition. After settling, the settling behavior was assessed visually and via turbidity measurements of the clarity of the liquid phase after settling of the agglomerates.

In a first series of experiments, the best results were obtained with 40% cationic charge polymer flocculating agent at a dosage of 10-30 ppm by weight. The emulsion type 40% cationic charge polymer visually performed better than the powder type 40% charge polymer, showing stronger and bigger agglomerates, with quite good settling rate (about 30 min).

A variant procedure was also considered wherein a second flocculating agent was added to the mother liquor at pH 1.8 (obtained in step 1), before centrifugation of the sludge fraction (step 2). This way the precipitating agent could be added to a mother liquor with reduced amount of sludge/particles.

7.2 Anionic Polymeric Flocculating Agents

Similar as in example 2.1 above, the Cd extraction efficiency of polyacrylamide based anionic polymeric flocculants with an anionic charge between 5% and 50% (that is a polyacrylamide having 5-50% of its moieties negatively charged, in emulsion (EM)) were investigated, with a non-ionic polymer (that is an uncharged polyacrylamide) and 40% cationic polymer (that is a polyacrylamide having 40% of its moieties positively charged) as a reference, at a dosage of 10-60 ppm by weight.

The 20% anionic charge polymeric flocculating agent (that is a polyacrylamide having 20% of its groups negatively charged) at a dosage of 10-30 ppm by weight performed best of all anionic polymers tested, albeit not as good as the 40% cationic charge polymer, the latter creating stronger and bigger agglomerates.

The non-ionic polymer did not create any agglomerates in the mother liquor at pH 1.8, even at higher dosages.

7.3 Cationic Polymeric Flocculating Agents with Different Structure

Similar as in example 7.1 above, the Cd extraction efficiency of structurally different 40% cationic charge polymer was investigated (differing in molecular weight and their branched nature) and compared to the linear polymeric 40% cationic charge polymer of example 7.1.

The differently structured 40% cationic charge polymers all gave similar results as the linear type of 40% cationic charge polymer of example 7.1. When it comes to polymers with higher molecular weight, the dosage which was used was smaller in comparison to the linear cationic type of example 7.1 and they created bigger floccs and settling rate was faster. However, when added to the mother liquor, a more viscous composition was obtained.

7.4 Combination of Cationic and Anionic Polymeric Flocculants

The Cd extraction efficiency of different combinations (concentrations) of a 10% anionic emulsion polyacrylamide (that is a polyacrylamide having 10% of its moieties negatively charged) with molecular weight ranging from 8.5 to 16.1*10$^6$ Dalton and a 40% linear cationic powder polyacrylamide (that is a polyacrylamide having 40% of its moieties positively charged) with molecular weight ranging from 7.1 to 9.5*10$^6$ Dalton was investigated, in particular 10% anionic emulsion polyacrylamide (that is a polyacrylamide having 10% of its moieties negatively charged) with molecular weight ranging from 8.5 to 16.1*10$^6$ Dalton+40% linear cationic powder polyacrylamide (that is a polyacrylamide having 40% of its moieties positively charged) with molecular weight ranging from 7.1 to 9.5*10$^6$ Dalton): 30 ppm+30 ppm and 40% linear cationic powder polyacrylamide (that is a polyacrylamide having 40% of its moieties positively charged) with molecular weight ranging from 7.1 to 9.5*10$^6$ Dalton+10% anionic emulsion polyacrylamide (that is a polyacrylamide having 10% of its moieties negatively charged) with molecular weight ranging from 8.5 to 16.1*10$^6$ Dalton): 20 ppm+10 ppm, and compared to the 40% cationic polymer used in example 7.1.

Visual observation indicates that using two type of charge of polymers can give stronger floccs, but at the same time the observed settling rate was slower in comparison to the polymer with 40% cationic charge.

Based on the above examples, it can be concluded that the addition of an ionic polymeric flocculating agent as an extra stage to a heavy metal (Cd) removal procedure is a promising method of liquids/solids separation in a phosphoric acid containing composition at pH 1.8.

The invention claimed is:

1. A process for the removal of heavy metals from a phosphoric acid containing composition, comprising the steps of
    (a) providing a phosphoric acid containing composition comprising dissolved heavy metals;
    (b) precipitating the dissolved heavy metals by adding a heavy metal precipitating agent to the composition of step (a), at a pH of 1.6 to 2.2 measured after a 13-fold dilution by volume using water, thereby obtaining a heavy metal precipitate in a phosphoric acid containing composition, wherein the heavy metal precipitating agent comprises a diorgano-dithiophosphinic acid or an alkali metal or ammonia salt thereof, represented by Formula 1

Formula 1

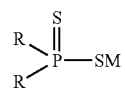

wherein R is a linear or branched hydrocarbon group selected from alkyl, aryl, alkylaryl, or aralkyl, and wherein the hydrocarbon group contains 3 to 20 carbon atoms, and M is H, alkali metal or ammonia;
    (c) adding a first flocculating agent having a molecular weight of $4\times10^6$ Dalton to $8\times10^6$ Dalton, to the composition obtained in step (b), wherein said first flocculating agent is a cationic polymer wherein 20% to 80% of the moieties making up the cationic polymer are cationic charged moieties, an anionic polymer wherein 10% to 50% of the moieties making up the anionic polymer are anionic charged moieties, or a mixture thereof, thereby obtaining agglomerates comprising the heavy metal precipitate in a phosphoric acid containing composition; and
    (d) separating the agglomerates comprising the heavy metal precipitate from the phosphoric acid containing composition, and wherein
the phosphoric acid containing composition is an acidic aqueous composition comprising from 6-21 wt % nitric acid, from 25 to 33 wt % phosphoric acid, from 3.5 to 5 wt % calcium and dissolved heavy metals, where the wt % is based on the total weight of the composition.

2. The process according to claim 1, wherein step (a) further comprises the steps of
    (i) adjusting the pH of a phosphoric acid containing composition comprising dissolved heavy metals to a pH of 1.6 to 2.2 measured after a 13-fold dilution by volume using water, thereby obtaining a phosphoric acid containing composition comprising a sludge fraction;
    (ii) optionally adding a second flocculating agent having a molecular weight of $4\times10^6$ Dalton to $8\times10^6$ Dalton, to the composition of step (i), wherein said second flocculating agent is a cationic polymer wherein 20% to 80% of the moieties making up the cationic polymer are cationic charged moieties, an anionic polymer wherein 10% to 50% of the moieties making up the anionic polymer are anionic charged moieties, or a mixture thereof; and
    (iii) separating the sludge fraction from the composition of step (i) or (ii).

3. The process according to claim 2, wherein the first and, optionally, the second flocculating agent is a copolymer of (meth) acrylamide and a chloro-methylated monomer or a copolymer of (meth) acrylamide and (meth) acrylic acid.

4. The process of claim 3 wherein the first and, optionally, the second flocculating agent is a copolymer of (meth) acrylamide and dimethylaminoethyl (meth) acrylate or (meth) acrylic acid.

5. The process of claim 2 wherein the pH of the phosphoric acid containing composition is adjusted by the addition of ammonia.

6. The process of claim 2 wherein the second flocculating agent is a cationic polymer wherein 20% to 60 wt % of the moieties making up the cationic polymer are cationic charged moieties, or an anionic polymer wherein 10% to 40% of the moieties making up the anionic polymer are anionic charged moieties, or a combination thereof.

7. The process according to claim 1, wherein the first flocculating agent is added in a dose of 3 to 30 $g/m^3$ acid composition.

8. The process of claim 5 wherein the dose is 3 to 20 $g/m^3$ acid composition.

9. The process of claim 1, wherein the precipitation and/or flocculation steps are performed at a temperature of 5 to 50° C.

10. The process according to claim 1 wherein the phosphoric acid containing composition is an acid digest of phosphate rock.

11. The process of claim 10 wherein the phosphate rock is digested by nitric acid, or a combination of sulfuric acid and nitric acid.

12. The process according to claim 1, wherein R in Formula 1 is selected from the group consisting of cyclohexyl, isopropyl, isobutyl, n-propyl, octyl, hexyl, phenylethyl and 2,4,4-trimethylpentyl.

13. The process of claim 12 wherein the heavy metal precipitation agent is sodium diisobutyldithiophosphinate.

14. The process according to claim 1, wherein the heavy metals are selected from cadmium, copper, nickel, mercury, zinc, arsenic, manganese and/or lead.

15. The process of claim 1 wherein the dissolved heavy metal is cadmium.

16. The process of claim 1 wherein the first flocculating agent is a cationic polymer wherein 20% to 60% of the moieties making up the cationic polymer are cationic charged moieties, or an anionic polymer wherein 10% to 40% of the moieties making up the anionic polymer are anionic charged moieties, or a combination thereof.

* * * * *